United States Patent
Adams et al.

(10) Patent No.: US 8,177,941 B1
(45) Date of Patent: May 15, 2012

(54) HYDROGEN FUEL STORAGE AND RECOVERY SYSTEM

(75) Inventors: Richard Adams, Chula Vista, CA (US); Candace Conwell, Escondido, CA (US)

(73) Assignee: United States of America as represented by the Sectretary of the Navy, Washington, DC (US)

( * ) Notice: Subject to any disclaimer, the term of this patent is extended or adjusted under 35 U.S.C. 154(b) by 386 days.

(21) Appl. No.: 12/684,014

(22) Filed: Jan. 7, 2010

Related U.S. Application Data

(63) Continuation-in-part of application No. 12/365,211, filed on Feb. 4, 2009, now Pat. No. 8,117,824.

(51) Int. Cl.
*C01B 3/00* (2006.01)
*C25B 5/00* (2006.01)

(52) U.S. Cl. .................................. 204/155; 204/156
(58) Field of Classification Search .................. 204/155, 204/156
See application file for complete search history.

(56) References Cited

U.S. PATENT DOCUMENTS

| | | | | |
|---|---|---|---|---|
| 7,169,489 | B2 * | 1/2007 | Redmond | 429/515 |
| 7,306,862 | B2 * | 12/2007 | Kramer et al. | 429/218.2 |
| 8,083,904 | B2 * | 12/2011 | Mofakhami | 204/155 |
| 2010/0135899 | A1 * | 6/2010 | Luo et al. | 422/186 |
| 2011/0147197 | A1 * | 6/2011 | Xie | 204/155 |

OTHER PUBLICATIONS

Bacal et al, "Volume Production Negative Hydrogen Ion Sources," IEEE Transactions on Plasma Science, vol. 33, No. 6, Dec. 2005, pp. 1845-1871.*

* cited by examiner

*Primary Examiner* — Keith Hendricks
*Assistant Examiner* — Colleen M Raphael
(74) *Attorney, Agent, or Firm* — Arthur K. Samora; Kyle Eppele

(57) ABSTRACT

A hydrogen storage and recovery system includes a substrate having embedded hydrogen molecules and a grid of cells. Each cell includes an electron source for directing electrons onto the substrate, two orthogonal magnetic or electric fields that are oriented so that the electrons pass through both magnetic fields prior to striking the substrate, and an ion guide. A voltage source establishes a potential for the electrons that is equal to the ionization potential of the hydrogen molecules, so that hydrogen molecules are ionized when the electrons impinge on the substrate. The magnetic fields can be manipulated to deflect, or change, the direction of said electrons passing through the fields, so that electrons strike the substrate at different locations, which allows for more recovery of the embedded hydrogen molecules from the substrate. The ion guide uses an applied electric field to draw hydrogen ions that have been ionized for subsequent storage.

18 Claims, 10 Drawing Sheets

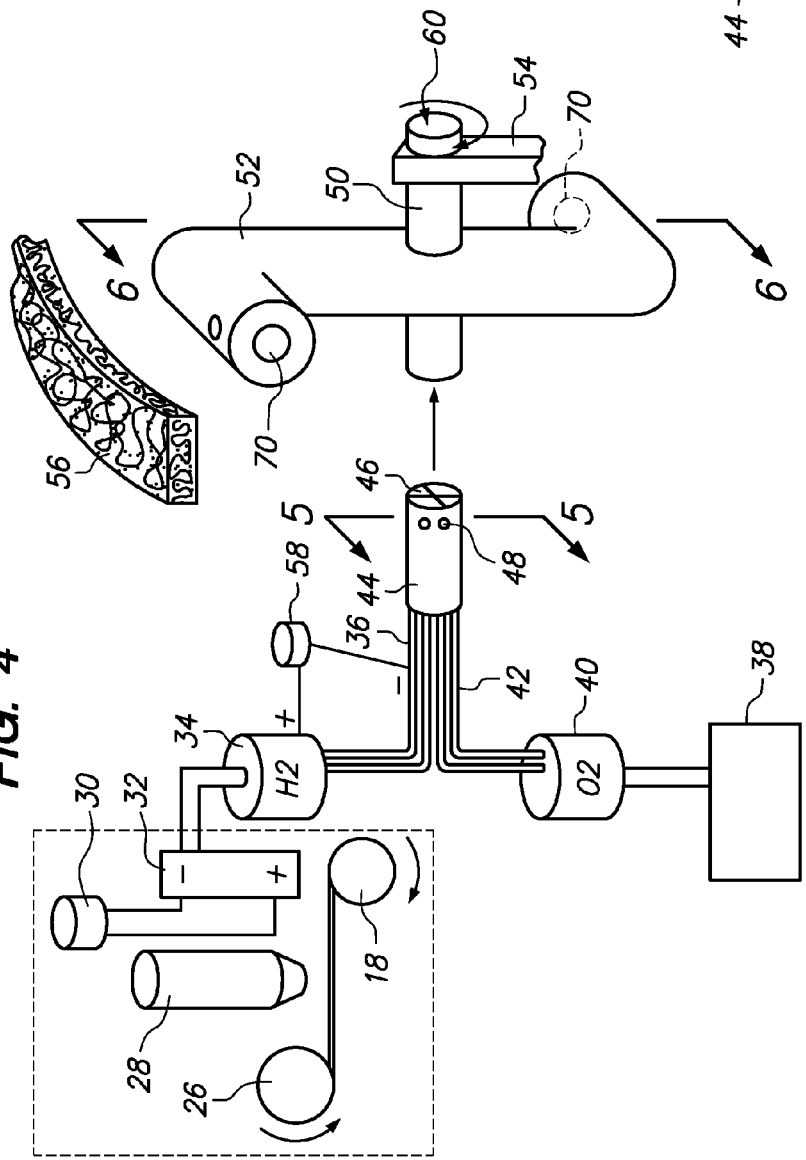

FIG. 9
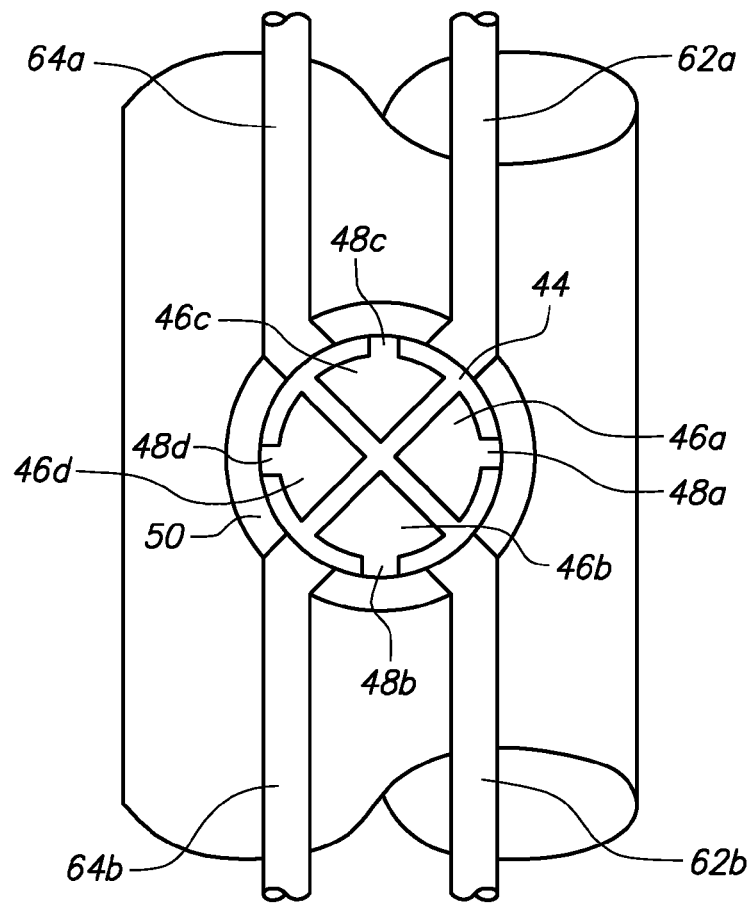
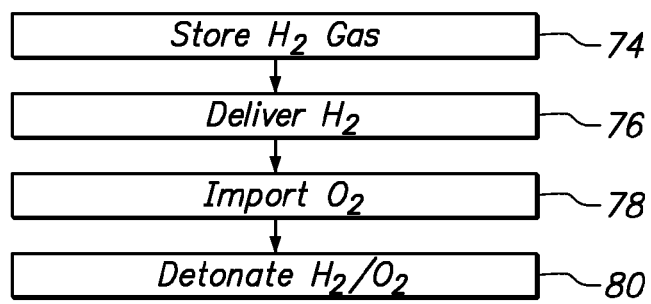
FIG. 10

HYDROGEN FUEL STORAGE AND RECOVERY SYSTEM

This application is a continuation-in-part of prior application Ser. No. 12/365,211, filed 4 Feb. 2009 now U.S. Pat. No. 8,117,824.

FEDERALLY-SPONSORED RESEARCH AND DEVELOPMENT

This invention (Navy Case No. 099802) is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice 619-553-2778; email T2@spawar.navy.mil.

FIELD OF THE INVENTION

This disclosure relates to vehicle propulsion systems. More specifically, this disclosure relates to vehicle propulsion systems that use hydrogen as a fuel in order to propel vehicles in a pollution-free manner. This disclosure is particularly, but not exclusively, related to safe efficient systems and methods for storing and recovering hydrogen, when hydrogen is to be used as a fuel to propel vehicles.

BACKGROUND OF THE INVENTION

Many vehicles are currently powered by petroleum-based fuels. The use of such vehicles and such fuels can be disadvantageous for several reasons. First, petroleum-based fuel can generate a relatively large amount of by-products from combustion (exhaust). The exhaust by-products generate greenhouse gases and pollution, which are profoundly changing and damaging the earth's environment. Additionally, petroleum resources that are needed for such vehicles are sometimes controlled by politically unstable regimes that are inimical to the United States.

In addition to the considerations listed above, most vehicles that use petroleum-based fuels are mechanically inefficient, because most of these vehicles have a propulsion system which requires the conversion of linear mechanical energy from the engine pistons to rotational energy to drive the vehicle wheels. Because such engines have many moving parts, much of the energy is used in overcoming frictional forces in the engine itself. Additionally, these types of engines also require great precision for the pistons and the cylinders. There are extreme temperature variations in many regions. For these regions, a large mass of the engine is required at least partly because of the need to maintain this precision even as the engine components expand and contract due to thermal expansion and a wide temperature range. As a result, more energy per unit mass is required to propel the vehicle, which results in more petroleum-based fuels being consumed, which further results in more harmful combustion by-products being released into the environment. What is desired is a propulsion system that runs on an alternative fuel, and one that moves in a rotary manner in the direction of the axle, in order to significantly increase the engine efficiency.

One possible alternative fuel could be hydrogen gas. Hydrogen gas is not petroleum-based, and consumption of hydrogen gas as a fuel could release primarily water vapor, which when condensed into liquid water would not harm the environment. But hydrogen gas is extremely combustible; it is very difficult to store hydrogen safely. Hydrogen gas frequently leaks through even very small holes.

In view of the above, an object of the present invention is to provide a propulsion system with a minimum of major moving parts. Another object of the present invention is to provide a system and methods for the safe, stable and efficient storage and distribution of hydrogen gas. It is another object of the present invention to provide a propulsion system, which uses fuel that can be made readily available in many countries throughout the world. Another object of the present invention is to provide a safe, efficient storage and recovery system for hydrogen fuel that uses a minimum of moving parts. Yet another object of the present invention is to provide a propulsion system that yields liquid water as its exhaust product. A further object of the present invention is to provide a propulsion system, and an associated hydrogen storage and recovery system, that can be easily manufactured in a cost-efficient manner.

SUMMARY OF THE INVENTION

A hydrogen storage and recovery system, and methods for use therefor, in accordance with several embodiments of the invention include a very thin substrate that is abundant with hydrogen molecules embedded therein, an electron source and electric field for accelerating and directing electrons onto said substrate, a first magnetic field, and a second magnetic field that is orthogonal to said first magnetic field. The first magnetic field and second magnetic field are oriented so that the electrons must pass through both magnetic fields prior to hitting the substrate. The magnetic fields can be controlled by a processor or computer.

The electron source can further include a voltage source that accelerates electrons to an energy that is equal to the ionization potential of the hydrogen molecules that are embedded in the substrate. After passing through the first magnetic field and the second magnetic field, the electrons impinge on the substrate with energy equal to the ionization potential for hydrogen, which ionizes the hydrogen molecules and leads to the liberation of hydrogen ions from the substrate. The magnitude of the first magnetic field and the second magnetic field can be varied to deflect, or change, the direction of said electrons passing through the fields, so that electrons strike the substrate at different locations, which allows for more recovery of the embedded hydrogen molecules from a greater surface area of the substrate. A voltage difference can then draw the hydrogen ions from the surface for use in the engine.

The system according to several embodiments of the present invention can further include an ion guide for receiving hydrogen ions that have been liberated from the substrate. At least one ion guide can surround the electron source in a concentric arrangement, or a plurality of ion guides can surround the electron source. The electron source and ion guide can be considered as one cell in several embodiments. A plurality of cells can be arranged in a grid, with the cells having a circular profile, a hexagonal profile or a square profile when viewed in top plan.

The methods according to several embodiment of the present invention can include the steps of embedding a plurality of hydrogen molecules in a substrate and providing a plurality or cells arranged in a grid, with each cell including an electron source, an electric field generated by a voltage difference, a first magnetic field and a second magnetic field orthogonal to the first magnetic field. The two magnetic fields are orthogonal to the electric field. The methods can then include the steps of establishing a voltage potential for the electrons that is equal to the ionization potential for the embedded hydrogen, and then directing the electrons from the electron source through the first magnetic field and the second magnetic field and onto the substrate. The location where electrons strike the substrate can be manipulated by selectively activating the first magnetic field and the second magnetic field to affect the direction of travel of the electrons passing therethrough. Once hydrogen ions are liberated from the substrate, the methods can include the step of drawing the ions through an ion guide for subsequent storage.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which:

FIG. 4 is an exploded side elevational view of the propulsion system according to several embodiments of the present invention;

FIG. 5 is a cross-sectional view taken along line 5-5 in FIG. 4;

FIG. 9 is the same view as FIG. 8, but when the ducts in the rotating arm not aligned with the holes in the axles;

FIG. 10 is a block diagram which can illustrate the steps of the methods according to several embodiments of the present invention;

DETAILED WRITTEN DESCRIPTION OF THE EMBODIMENTS

Figure 1:
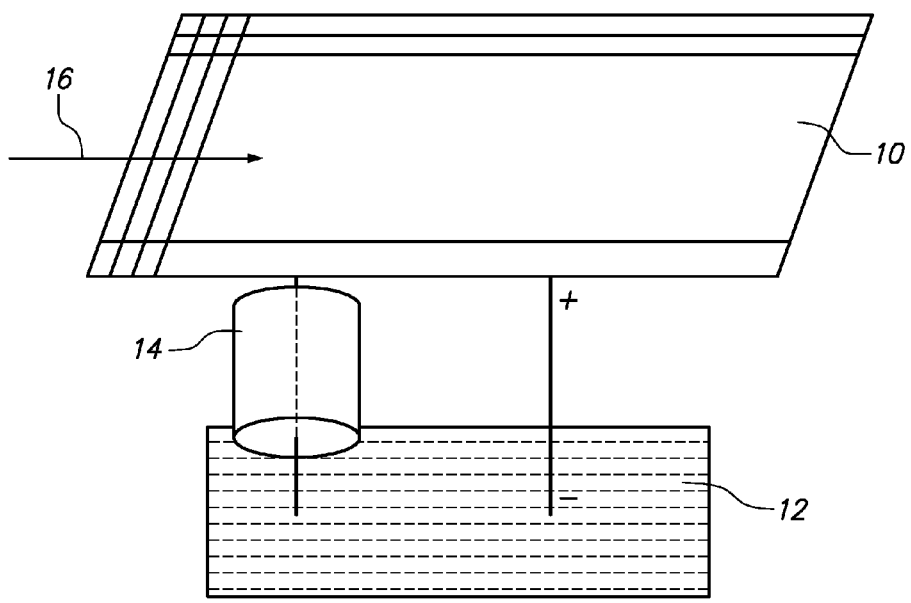
FIG. 1 is a block diagram that illustrates the electrolysis of sea water to yield hydrogen for further use in the propulsion system according to several embodiments of the present invention.

Referring initially to FIG. 1, FIG. 1 presents an exemplary method of generating hydrogen for use as fuel. As shown, a solar cell 10 that is powered by sunlight 16 can be used to apply a voltage difference to seawater 12, in order to extract hydrogen from sea water in a manner known in the prior art. This electricity can electrolyze the salt water to separate it into hydrogen and oxygen. The released hydrogen can be collected in container 14 for further use as described hereinafter. The oxygen resulting from the electrolysis process can either be released to the atmosphere or used for separate purposes.

1. Hydrogen Storage

A. Videotape Configuration Embodiment

Once liberated, the hydrogen must be stored in a manner that allows for safe transport, until it is ready for use. Absorption could be used to bind the hydrogen to a metal layer so that it would not be flammable or otherwise dangerous. To do this, and referring now to FIGS. 2 and 3, hydrogen liberated from sea water to can be bound to a metal through the use of an electric field. More specifically, a roll 18 of aluminum strip 20 can be used. As can be seen in FIG. 3, roll 18 comprises aluminum strip 20 and a thin binding layer of hydrogen-absorbing metal 22 that is deposited onto aluminum strip 20. The binding layer 22 can be placed on only one side of substrate 20, as illustrated in FIG. 3, or on both sides in a "videotape" configuration. The videotape configuration is the structure depicted within the dotted line in FIG. 4. Alternatively, and as illustrated in FIGS. 11-14 and illustrated and described more fully below, a "cookie sheet" storage configuration could be used for storage of the hydrogen. For these embodiments, the cookie sheet configuration and structure could be substituted for the video tape configuration and structure within the dotted line in FIG. 4.

For several embodiments of the present invention, zirconium or palladium can be used as the metal for binding layer 22. The palladium layer would be deposited on a thin strip of a common metal such as aluminum. The aluminum can have a thickness of around 0.001 m and can be flexible enough to be rolled compactly. The width could be 0.10 m. Palladium is a metal that absorbs significant amounts of hydrogen gas; $10^{-3}$ kg of palladium can absorb up to $14 \times 10^{-6}$ kg of hydrogen gas. Assuming an absorption efficiency of 0.36, this means that for each gram of palladium, up to $5 \times 10^{-6}$ kg of hydrogen could be absorbed. The density of aluminum is 2700 kg/m$^3$. Since palladium has a density of 12023 kg/m$^3$, and using the widths and thicknesses for the strip 20 and layer 22 cited above, the length of 1 gram of palladium that holds $14 \times 10^{-6}$ kg of hydrogen is $8.3 \times 10^{-3}$ m. Thus, the length of the strip that contains enough hydrogen to supply $1.42 \times 10^9$ Joules (the energy released by 11.5 gallons of gasoline, which is sufficient to propel a Nissan Sentra for 430 miles) is 176 meters, and the radius of the roll of aluminum with a layer of palladium to supply this energy is approximately one-quarter of a meter.

Figure 2:
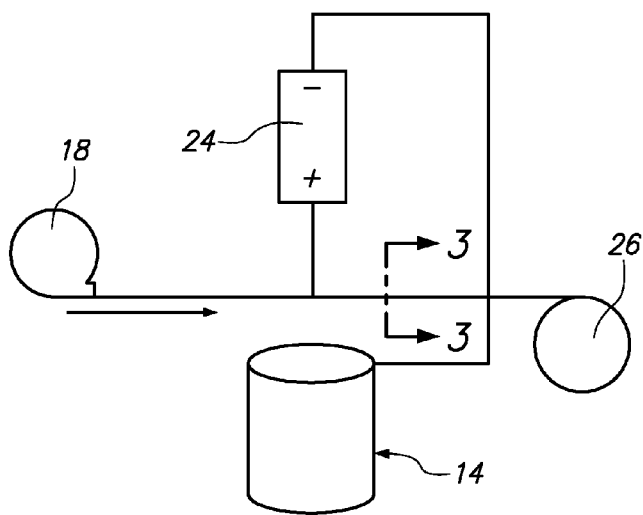
FIG. 2 is a block diagram that illustrates the binding of hydrogen to a thin layer or film of hydrogen-absorbing metal deposited onto an aluminum substrate for further use as fuel in the propulsion system according to several embodiments of the present invention.
Figure 3:
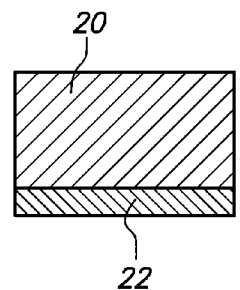
FIG. 3 is an enlarged cross-section view taken along the line 3-3 in FIG. 2.

To entrap the hydrogen molecules into the binding layer, and as shown in FIG. 2, a voltage source 24 can be used to supply a voltage difference between aluminum foil 18 and hydrogen container 14. The voltage difference would attract the hydrogen gas. The gas made by electrolysis is located below the layer of palladium. The hydrogen container 14 is placed below the foil to use the natural buoyancy of hydrogen, rather than oppose it. A voltage difference is applied between the palladium and the hydrogen gas as the aluminum foil is slowly passed over the hydrogen container 14. The voltage difference attracts the hydrogen molecules, which then adhere to the palladium binding layer 22. The use of palladium in the last sentence and subsequent sentences does not exclude other metals being used in a similar manner.

Over a period of time, a sufficient quantity of hydrogen would then get absorbed in the palladium binding layer. Once trapped in the metal, the hydrogen would not be flammable or otherwise toxic. The foil can then be rolled up into a fuel roll 26. Once confined as described above, the hydrogen could distributed by means that are known in the prior art.

In order to be used as fuel for the engine according to several embodiments of the present invention, the absorbed hydrogen must be released from binding layer 22. To do this, and referring now to FIG. 4, an ionization source 28 such as a laser or an electron beam is provided. The laser can be tuned to the wavelength of ionization of the hydrogen molecules in the palladium, eighty nanometers (80 nm). The laser will liberate the electrons of many of the hydrogen molecules within its beam. The laser beam could have a spot size with radius $1.6 \times 10^{-2}$ m and be directed at aluminum foil 20 is fuel roll 26 is unrolled under the laser. The action of foil 20 from fuel roll 26 will be similar to tape inserted into a videotape player.

Instead of a laser, an electron beam could be used to ionize the hydrogen molecules. The ionization energy of bound electrons within a hydrogen molecule is 15.3 electron Volts (eV). That of an electron in the hydrogen atom is only 13.6 eV. Since almost all the hydrogen contained in binding layer 22 will be in molecular form, the former value applies. Electrons can be released from a filament by heating from a current. The electrons can be focused by a magnetic field and accelerated by an electric field so that their most probable energy is 15.3 eV. The electrons are assumed to enter a cylindrical chamber whose entrance has zero voltage. The electrons would then undergo a voltage drop of 15.3 V to have on average the correct energy. The electrons striking the hydrogen molecules in the metal would then ionize them. The ionized hydrogen would then be drawn out of the metal by an applied electric field. Focusing the beam need not be exact, merely enough to ensure that most of the electrons undergo a similar acceleration from the voltage difference.

Once the hydrogen molecules are ionized (bound electrons ejected from the molecules to unshield a positively charged nucleus) an electric field from second voltage source 30 can draw the hydrogen ions from the binding layer 22 towards acceleration tube 32. Similar to the action of a triode, the electric field accelerates the ions, most of which will pass through an acceleration tube 32 and into a fuel storage chamber 34.

Once the palladium binding layer 22 is depleted of readily available hydrogen, it can be re-used as an aluminum/palladium foil roll 18. The roll 18 may be re-used for absorbing hydrogen as described above.

B. Cookie Sheet Configuration Embodiment

Figure 11:
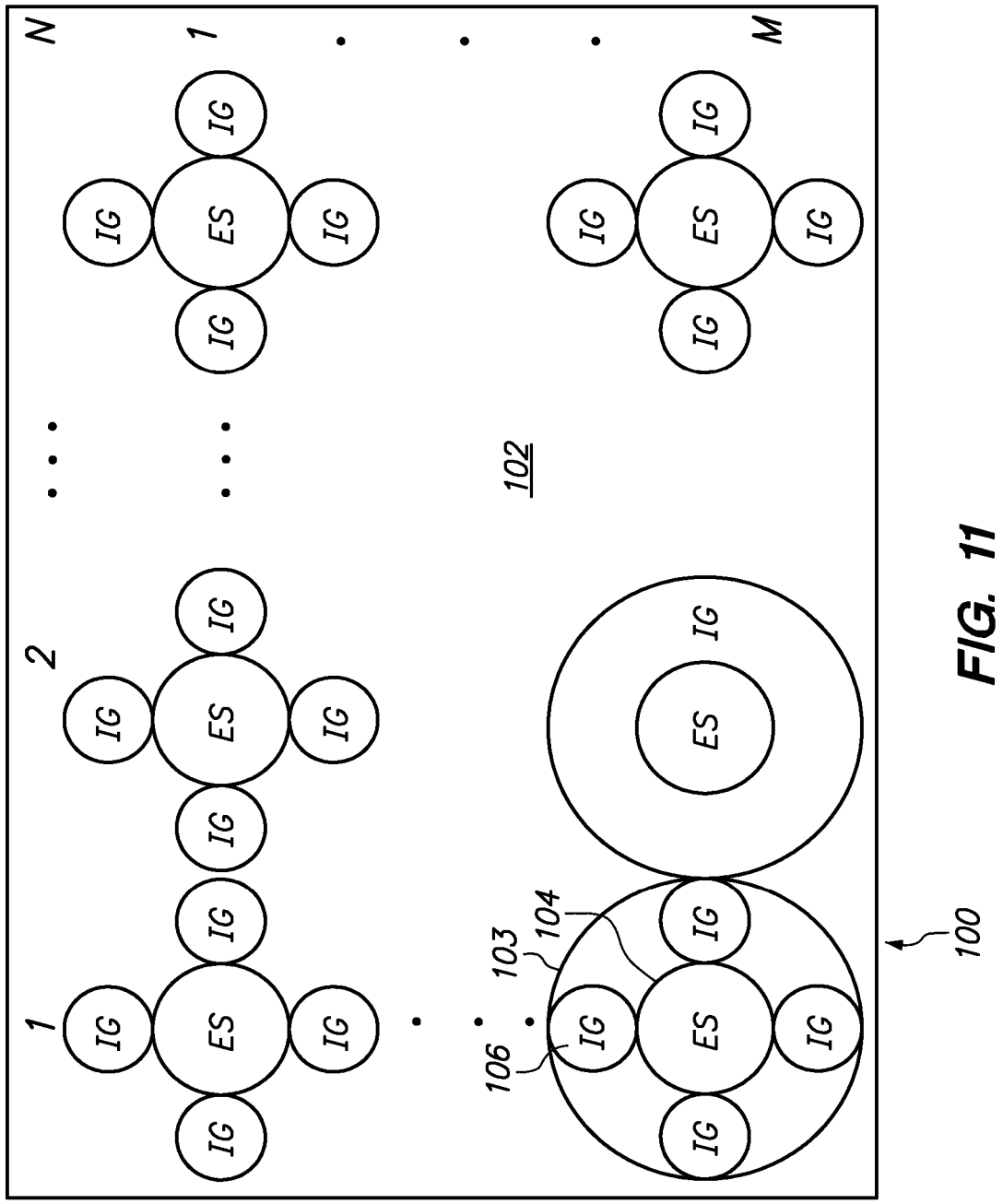
FIG. 11 is a top plan view of an alternative hydrogen storage and recovery system for use with the propulsion system according to several embodiments of the invention.
Figure 12:
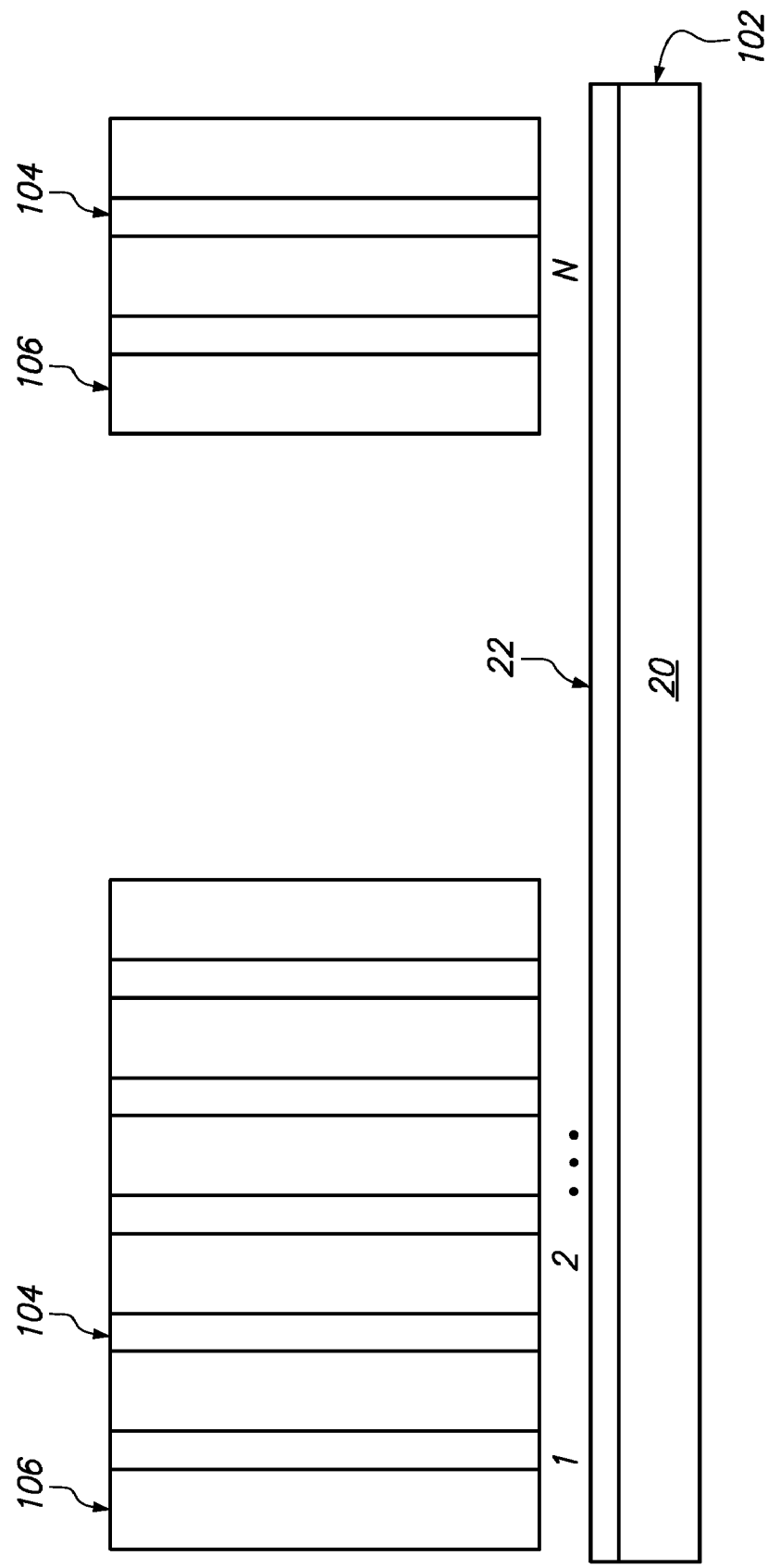
FIG. 12 is a side elevational view of the storage system of FIG. 11.

Instead of the roll 18/fuel roll 26 configurations described above that passes aluminum strip 20 and binding layer 22 past an ionization source 28, an alternative structure and cooperation of structure could be used to store and to recover hydrogen for use within the hydrogen propulsion system described herein. Such a system 100 is illustrated in FIGS. 11-14. As shown in FIGS. 11 and 12, system 100 can include a sheet 102 having a plurality of cells 103 arranged in an N×M grid. Each cell 103 can include at least one electron source 104 for generating and directing electrons at sheet 102 and an ion guide 106 for directing and collecting hydrogen ions that have ionized as a result of electrons impinging on sheet 102 at the ionization potential of hydrogen.

Multiple ion guides 106 can be arranged around electron sources 104, as shown in FIG. 11, or a single annular ion guide 106 can be arranged in a concentric relationship around an electron source, as also shown in FIG. 11. Other geometries could be applicable to both the grid of cells 103 and the sheet 102. For example, the cells 103 can have a square profile or a hexagonal profile when viewed in top plan. With a hexagonal configuration, the N×M grid could present a honeycomb-like appearance when viewed in top plan. Sheet 102 can also have the same aluminum metal and binding layer 22 materials that were cited above for roll 18.

In one embodiment, sheet 102 can have length (L) of one meter (1 m) and width (W) of 0.75 m. The thickness (t) film of binding layer 22 can be $10^{-3}$ m, and thickness of the aluminum portion of sheet 102 can be about $10^{-2}$ m, or one centimeter (1 cm, see FIG. 3). The density of the material for binding layer 22 can be $\rho_a$ (equal to 12023 kg/m$^3$ for palladium). The ratio of hydrogen absorbed to mass of hydrogen-absorbing material is denoted as r (equal to 0.014 for palladium). Each mole of hydrogen and oxygen molecules releases 286 kilo-Joules (kJ) of energy (denoted as $E_H$). Each mole of hydrogen has a mass of $2 \times 10^{-3}$ kg ($M_H$). If the percentage (p) of hydrogen available to be pulled out of the sheet is a maximum of 0.90, the energy available in each sheet of hydrogen absorbing material of this size and thickness could be described by the relationship $(r)(L)(W)(t)(p)(E_H)(\rho_a)/M_H$. The energy in each gallon of 87 octane gasoline is $1.24 \times 10^8$ J. Therefore, the 1 m×0.75 m sheet of hydrogen-laden material on the aluminum substrate has an energy equivalent to 0.13 gallons of gasoline. Multiple sheets of the thin substrate and very thin hydrogen-laden metal can be stacked for extended range.

Figure 13:
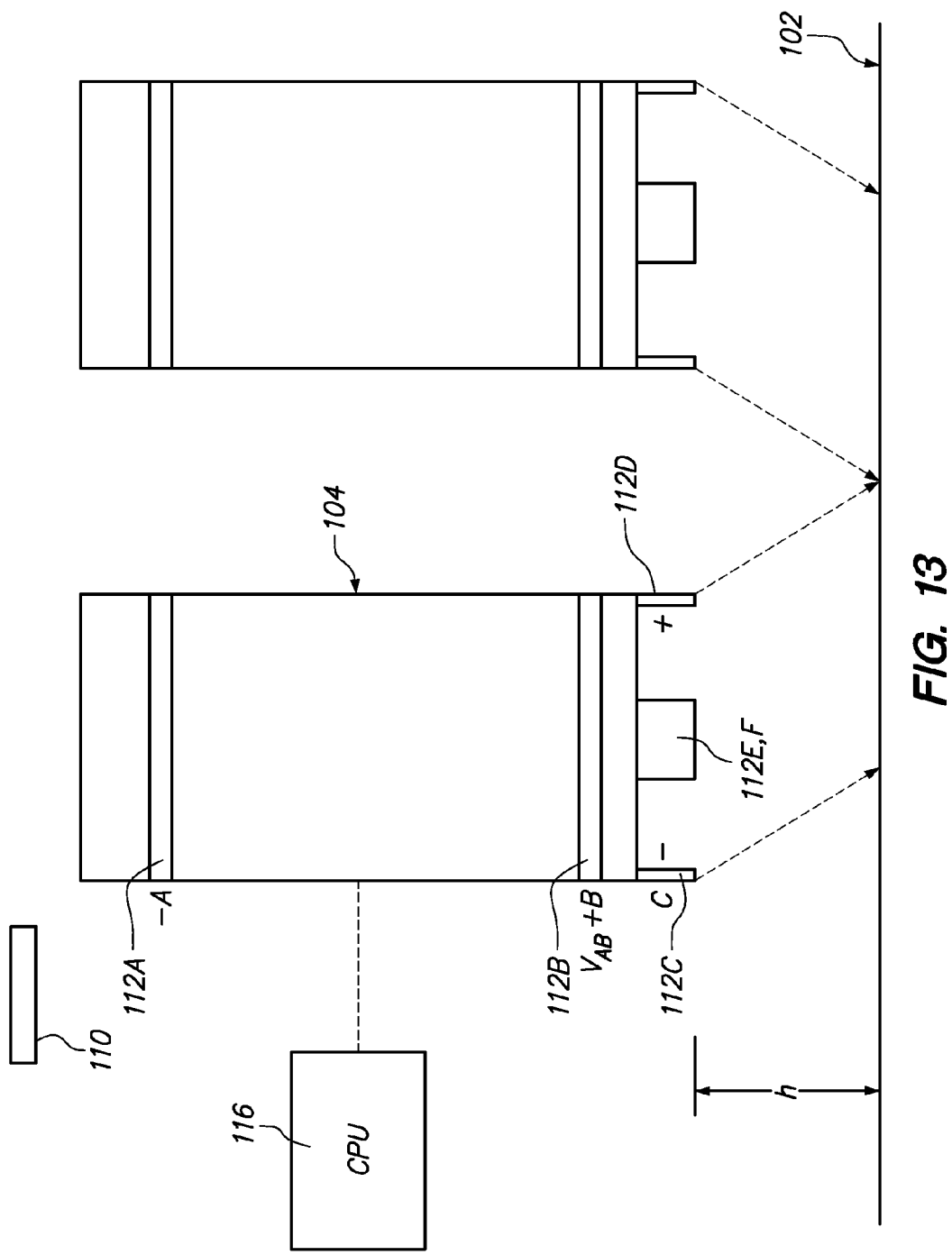
FIG. 13 is an enlarged side elevational view of adjacent electron sources from the system shown in FIG. 11; and, FIG. 14 a side elevational view of the system of FIG. 12, which further illustrates the manner in which ionized hydrogen ions are collected by the storage and recovery system of FIG. 11, according to several embodiments of the present invention.

In paragraphs 0039 to 0041 we present two potential embodiments of a mechanism to deflect the accelerated electrons to different portions of the hydrogen-laden substrate are presented. One embodiment uses electric fields and voltage differences. The other embodiment uses magnetic fields and current loops. Referring now to FIG. 13, the structure of electron source 104 is shown in greater detail. As shown in FIG. 13, for each cell 103, a heated filament 110 can be located at the top of a hollow tube 108. One possible material for the filament 110 could be tungsten, although other materials could be used. The heating releases electrons from the filament via thermionic emission. A pair of electrodes, 112A and 112B, are located at the top and bottom of the hollow tube 108, respectively. Electrodes 112A and 112B generate a voltage difference, $V_{AB}$ that accelerates the electrons from filament 110 in the vertical direction, downward through tube 108 and toward sheet 102. Stated differently, $V_{AB}$ accelerates the electrons through tube 108 and toward the hydrogen-rich binding layer 22 at a potential difference equal to the ionization potential of hydrogen molecules (15.3 eV). As the electrons pass through tube 108, two pairs of electrodes, 112C and 112D, and 112E and 112F, are oriented so that each respective pair of electrodes, when activated, establish respective voltage potentials $V_{CD}$ and $V_{EF}$ that are perpendicular to each other, and to voltage potential $V_{AB}$.

$V_{CD}$ and $V_{EF}$ can be selectively energized to deflect the electrodes in two orthogonal horizontal directions. The sum of the three orthogonal voltage differences must be 15.3 V. By definition, 1 electron volt (eV) is the increase in energy of an electron when going through a voltage difference of 1 volt. The ionization energy of molecular hydrogen in its ground state is 15.3 eV. It is desired to use the narrow band of energies for which the ground state of the hydrogen molecule is resonant to selectively ionize these molecules. At room temperature a certain small percentage of the molecules will be separated into constituent atoms.

Instead of electrodes 112C-F, there can be an advantage to using two orthogonal current loops at the bottom of the electron source 104 rather than electrodes 112. Electrodes with voltage differences generate electric fields which change both the magnitude and direction of the electrons emerging from the ES. Current loops generate static magnetic fields, which change only the direction of the electrons passing through tube 108. Static magnetic fields add no energy to the charged particles. The voltage difference between points A and B can remain constant. There is no need to change $V_{AB}$ to make the electrons strike another part of the hydrogen absorbing metal with the energy 15.3 eV. Stated differently, using static magnetic fields to deflect the electrons horizontally instead of electrodes 112C-F can make it easier to ensure that the electrons strike substrate at an energy of 15.3 eV, which further presents a simpler selective activation (control) problem for the processor 116 for the system 100, as described more fully below.

Whether current coils or electrodes are used to provide the horizontal deflection, and as further illustrated in FIG. 13, the maximum angle of deflection from the vertical should probably be no more than 30° to 45° so that electrons from adjacent cells 103 cover the entire surface area of the binding layer 22 on sheet 102. There can be some overlap between the resultant electron beam from one electron source 104 to that of an adjacent electron source 104. The product of the value of the electric charge and the sum of the vertical voltage and the two horizontal voltages must equal the resonant energy to ionize the hydrogen molecules. A processor 116 can control the values of these voltages. Both of the horizontal voltage differences can be activated at the same time. Such activation can allow almost all of the surface are of the binding layer 22 of hydrogen-absorbing material (the surface area of sheet 102) to be subject to the action of the electron beam. As mentioned above, the complexity of changing the voltage in the vertical direction in response to changing the direction of the electrons in the horizontal is reduced if magnetic fields are used.

Figure 14:
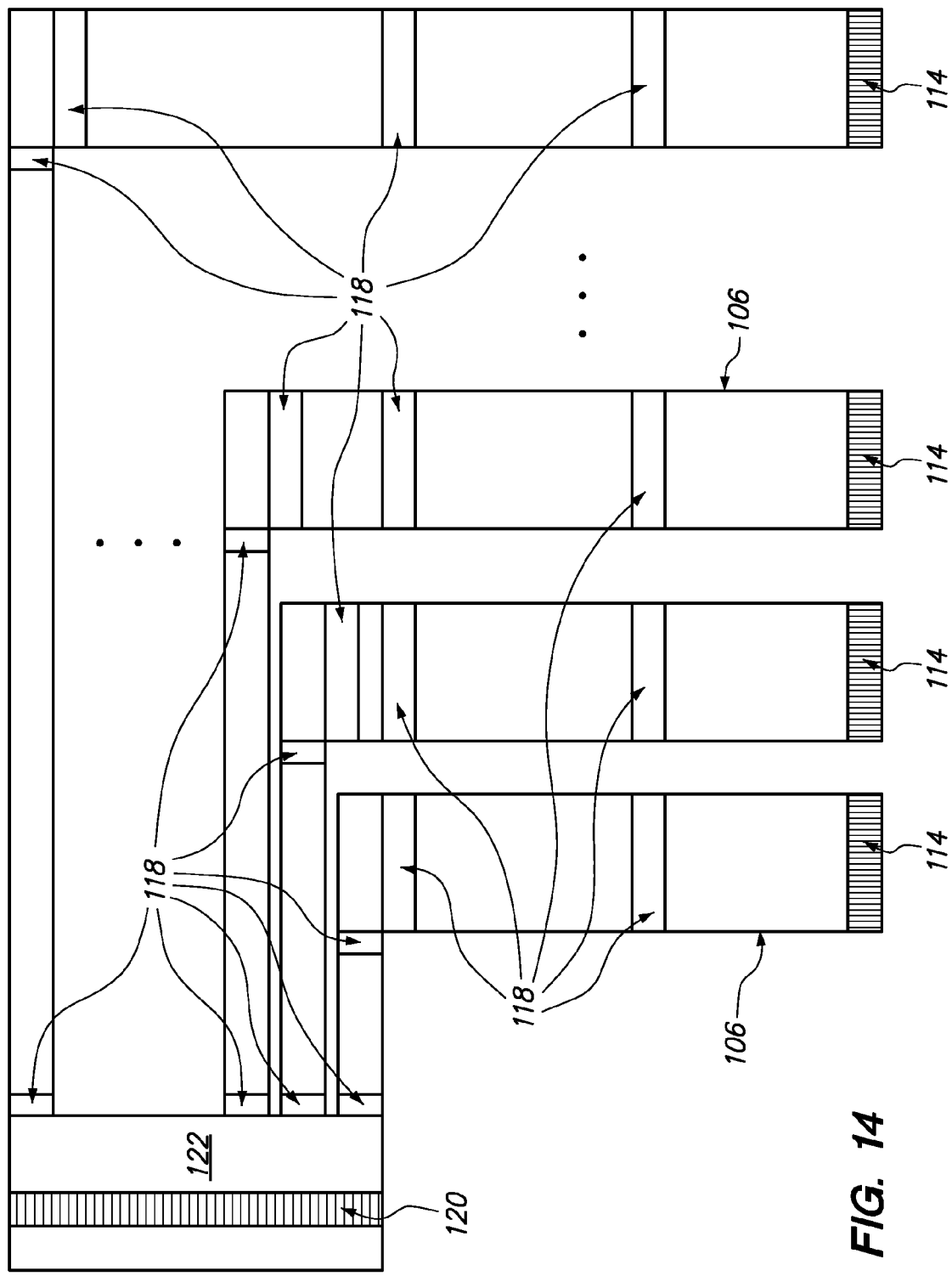

FIG. 14 illustrates the ion guides 106 in greater detail. As mentioned above, the ion guides 106 surround the electron sources 104. Ion guide electrodes at the bottom of the ion guides attract the ionized hydrogen molecules and pull them from the hydrogen-absorbing material in binding layer 22. The ions then leave the binding layer 22 and enter ion guides 106. The voltages in the bottom-most electrodes 114 are synchronized with the internal electrodes 118 in the higher portions of the ion guides 106, so that the ions are continually pulled forward to a much larger collector tube 122. Many of the ion guides feed the larger collector tube 122. The function of the larger collector tube 122 is to provide a section for the monitoring of the flow of ions. As shown in FIG. 14, a current meter 120 such as that manufactured by the Fisher Corporation can monitor the flow of ionized hydrogen molecules. As long as there is a sufficient flow of ions, the horizontal electrodes on the electron source aim the electrons at the same place. When this flow is below a certain threshold, the horizontal electrodes or current loops aim the electrons to a new place. When an area of sheet 102 near one electron source 104 is depleted of hydrogen, an adjacent electron source or a different electron source in a different location of system 100 can be activated. Processor 116 can monitor the flow of hydrogen ions and control of voltages of the electron source electrodes so that up to 90% of the hydrogen in the whole sheet can be obtained.

For operation, sheet 102, which includes the hydrogen absorbing material in binding layer 22 and aluminum substrate 20 is placed into the vehicle below the grid of cells 103, by the consumer, or possibly an agent at a central distribution point similar to a gas station. The size, shape, and mass of sheet 102 should be adjusted so that the sheet is easily maneuvered into place by the consumer or by the agent.

A battery (not shown) or similar heating source, can heat the filament 110 near the top of an electron source 104, which releases electrons via thermionic emissions. The battery can also activate electrodes 112A and 112B, which establishes a voltage difference $V_{AB}$ which accelerates electrons through tube 108. Electrodes 112A and 112B accelerate electrons through the tube at an energy of 15.3 eV, the ionization potential of hydrogen molecules in the ground state. As the electrons strike binding layer 22 at the ionization energy for hydrogen molecules (15.3 eV), the hydrogen molecules are ionized within the binding layer 22.

A voltage difference established by bottom electrodes 114 in the ion guide 106 attracts the hydrogen ions to liberate them from binding 22. Once the ions are in the ion guides 106, the bottom electrodes 114 can be deactivated and internal ion guide electrodes 118 that are downstream can be activated by processor 116. Several stages of internal electrodes 118 guide the molecules through ion guide 106 and into a larger container tube 122 which has a current meter 120. The current meter 120 monitors current flow through container tube 122 (which is indicative of the number of hydrogen passing therethrough). When that flow has decreased below a predetermined threshold, the processor 116 controlling system 100 activates one or more of the horizontal electrodes (to supply voltage differences $V_{CD}$ and $V_{EF}$) at the bottom of the electron source 104, so that electrons strike binding layer on a different area of the sheet 102.

The horizontal electrodes or current loops change the direction of the electron beam so that it strikes a different section of the hydrogen absorbing material. When every region of the hydrogen absorbing material that can be reached by the beam of one electron source is depleted of hydrogen, the computer directs an adjacent electron source to activate. The cycle describes in the previous paragraph can be repeated until all electron sources 104 have been used and the entire surface area of sheet 102 have been depleted of hydrogen.

2. Hydrogen Engine Operation

Once the hydrogen ions are liberated and stored, either from the roll system or the sheet recovery system described above, and referring again primarily to FIGS. 4 and 5, a third voltage source 58 can attract the hydrogen ions from fuel storage chamber 34 through hydrogen feed tubes 36 and into axle 44. By referring to FIGS. 4 and 5, it can be seen that hydrogen fuel delivery chambers 46a and 46b are formed in axle 44. Voltage source 58 can be used to guide and accelerate the hydrogen ions further through hydrogen feed tubes 36 and into fuel delivery chambers 46a and 46b. To ensure that voltage sources 30 and 58 do not work against each other, voltage sources 30, 58 can be timed so that one is energized while the other is de-energized using processor 116. At the appropriate time, a plunger (not shown) or similar pressurization means can increase the pressure of the hydrogen gas in the fuel delivery chambers 46 by a factor of ten, or by a factor necessary to deliver the hydrogen into rotating arm 52 at a pressure that is sufficient for detonation, as discussed hereinafter.

The oxygen that is needed for operation of the engine according to several embodiments of the present invention can be obtained by separating the oxygen from the atmosphere. To do this, there are commercially available devices that are known in the prior art which remove nitrogen from the air (which essentially leaves oxygen). One such exemplary device is a commercial air scrubber 38 (used, for example, by patients in need of assistance in breathing), which can purify the air to deliver ten liters (10 l) of gas per minute that is ninety to ninety-five percent (90-95%) pure oxygen by weight, which is sufficient for operation of the engine according to several embodiments of the present invention. The nearly pure oxygen can be sent to an oxygen collection chamber 40. When the oxygen is needed for operation of the engine, oxygen is delivered from oxygen collection chamber 40, through oxygen feed tubes 42 and into oxygen delivery chambers 46c and 46d that are formed in axle 44. As described above for hydrogen, a plunger (not shown) can be used increase the oxygen pressure by a factor that is selected according to user needs. This increase in pressure can force the oxygen into rotating arm 52 at sufficient pressure for detonation, as described more fully below.

As described above and illustrated in FIGS. 4 and 5, there can be a total of four delivery chambers 46, hydrogen delivery chambers 46a and 46b, and oxygen delivery chambers 46c and 46d, that can be formed in axle 44. The axle 44 is further formed with holes 48a, 48b, 48c and 48d that correspond to respective fuel delivery chambers 46a, 46b, 46c and 46d (shown in FIG. 5) through which the hydrogen and oxygen will exit the chambers 46 and enter rotating arm 52 as described below. The rotating arm 52 can be formed with a sleeve 50 that defines an opening 60. The sleeve and rotating arm 52 can be formed as an integral unit, or the sleeve can be manufactured separately and fastened to rotating arm.

Figure 6:
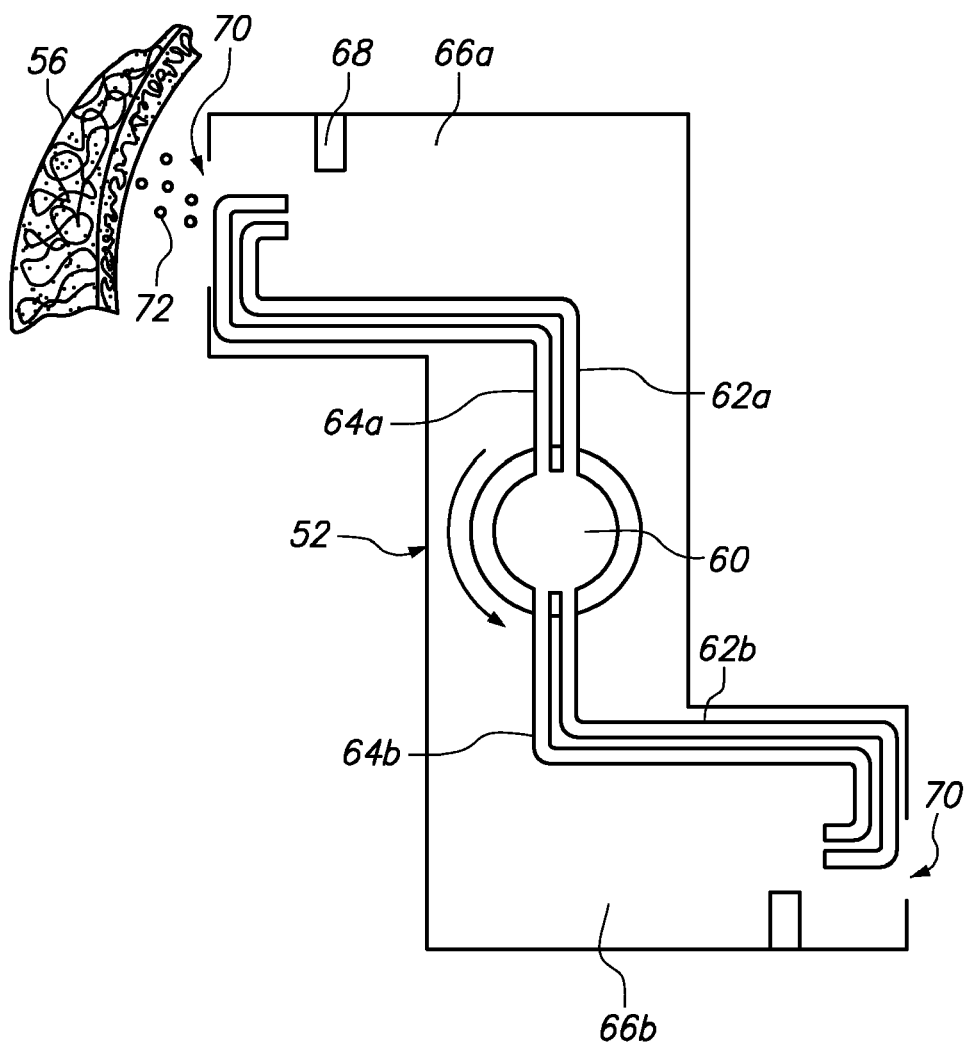
FIG. 6 is a cross-section view taken along line 6-6 in FIG. 4.
Figure 7:
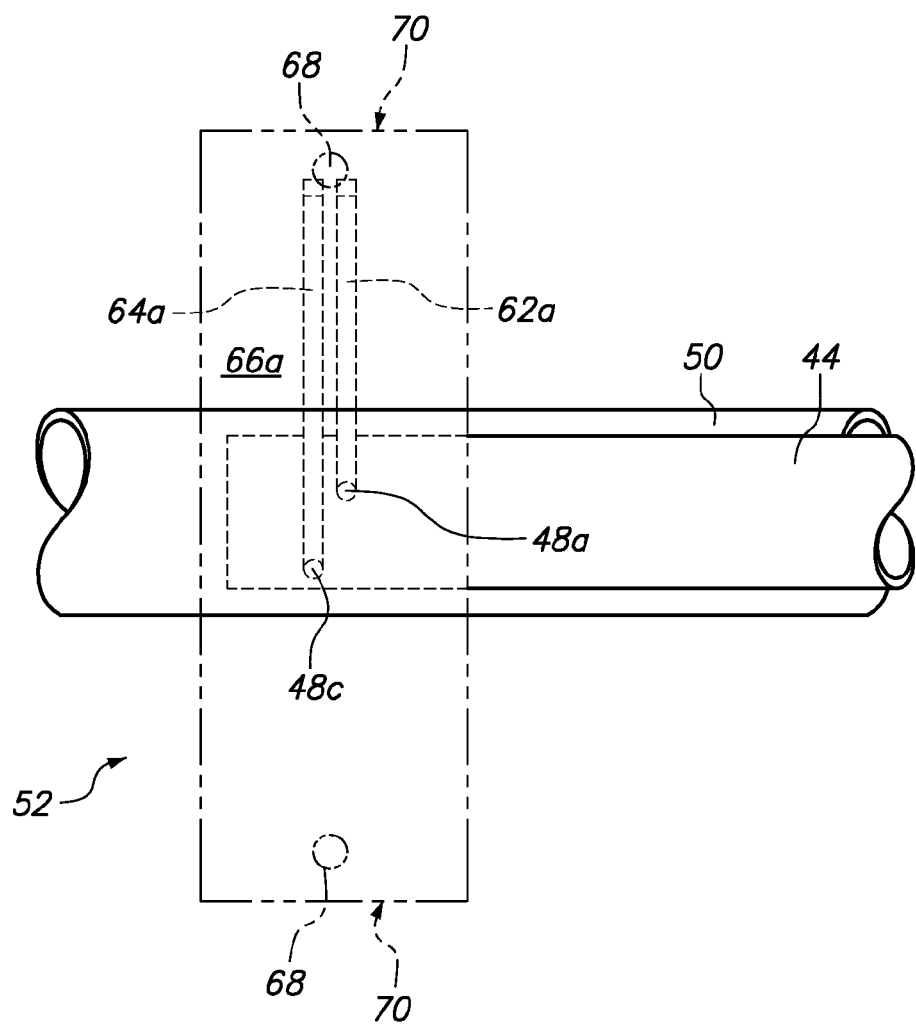
FIG. 7 is a top plan view of the rotating arm for the system shown in FIG. 4, with the rotating arm at the twelve o'clock position, and with the several of the ducts that are formed in the rotating arm shown in phantom.

Referring now to FIGS. 6-9, the structure of rotating arm 52 is shown in greater detail. The rotating arm 52 is the main moving part of the engine and can be formed with four ducts 62, 64 in its interior. More specifically, and as shown in FIGS. 6-7, the rotating arm is formed with at least one hydrogen duct 62 (FIG. 6 illustrates two hydrogen ducts 62a and 62b) in the rotating arm. The duct can be formed integral to the rotating arm, or it can be manufactured via tubing of suitable materials and then inserted into the rotating arm. The duct 62 establishes a path of fluid communication between opening 60 in sleeve 50 and detonation chambers 66. In FIG. 6, hydrogen duct 62a establishes a fluid communication between opening 60 and detonation chamber 66a, while hydrogen duct 62b establishes a fluid communication path between opening 60 and detonation chamber 62b. In similar fashion, oxygen ducts 64a and 64b establish a path of fluid communication between opening 60 and respective detonation chambers 66a, 66b.

Figure 8:
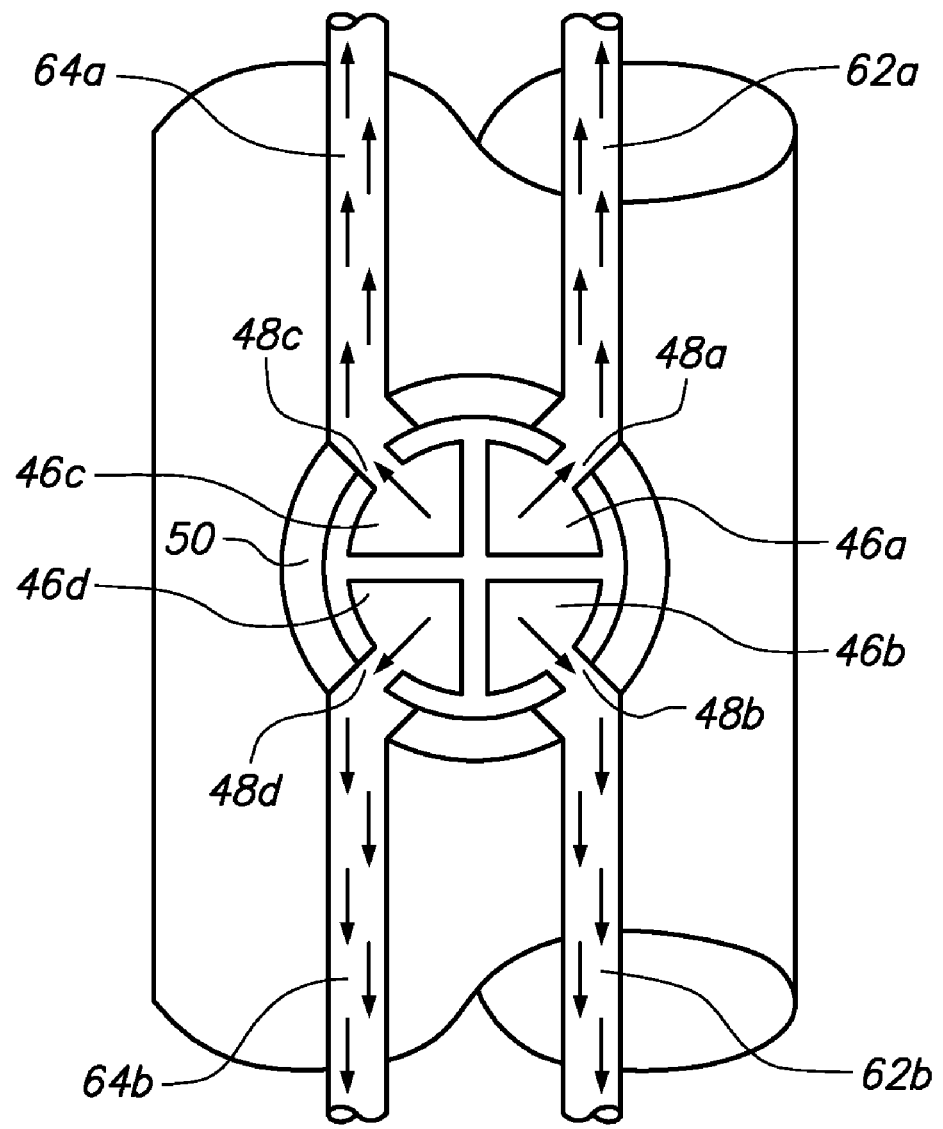
FIG. 8 is the same view as FIG. 6, but further illustrates the fluid communication path of hydrogen and oxygen from chambers in the axle into the rotating arm ducts (and further into the detonation chamber) when the rotating arm is disposed around the axle and the arm ducts are aligned with the axle.

Once axle 44 is inserted into sleeve 50 for operation, the sleeve 50 can block the gases from entering the ducts 62, 64 in rotating arm 52 when the holes 48 in axle 44 are not aligned with ducts 62, 64 in axle. This configuration is shown in FIG. 9. However, when holes 48 in axle 44 can become aligned with ducts 62, and 64 in axle 44, as shown in FIG. 8 as the arm 52 rotates around axle 44. When this occurs, a path of fluid communication becomes established from hydrogen delivery chamber 46a through hole 48a and hydrogen duct 62a, and detonation chamber 66a. Similarly, a path of fluid communication can become established form oxygen delivery chamber 46c, through hole 48c and oxygen duct 64a and into detonation chamber 66a. Similar paths of fluid communication can be established between hydrogen and oxygen delivery chambers 46b, 46d and detonation chamber 66b. In this manner, hydrogen and oxygen gases can be delivered into detonation chambers 66a, 66b under pressure and mix. The oxygen and hydrogen mix rapidly due to the turbulence created by the motion.

There is a range of pressure and temperature at which hydrogen and oxygen detonates rather than combusts. The hydrogen and oxygen is delivered to the detonation chamber 66 at a pressure and temperature that favors detonation vice combustion when the mixture is ignited. Each detonation chamber can include a spark plug 68 that is selectively ignited to detonate the hydrogen/oxygen gas mixture in the detonation chamber. A typical time scale for the completion of the ignition is $1 \times 10^{-6}$ seconds.

The detonation of the hydrogen and oxygen mixture will be explosive in character. Under certain conditions of pressure and temperature, the explosion will form a shock wave. The shock wave will propagate toward the closed end of each chamber. The shock wave leaves in its wake a highly compressed gas that moves at a speed greater than the speed of sound. Both the shock and the wake import a significant amount of momentum to the closed end of detonation chamber 66. From the Huguenot relations and the assumed adiabatic index of hydrogen (gamma=1.4 due to the diatomic character of both hydrogen and oxygen), the fluid in the wake of the shock most likely moves at a speed ⅚ of the speed of the shock. Because the chambers are at the end of arms at whose center is an axis, the momentum imposed upon detonation chambers 66 will start or accelerate rapid rotation of rotation arm 52.

It is possible that there will be instabilities in the front of the shock wave, but any instability probably will not form rapidly enough before the detonation wave hits the end of the cylindrical chambers. Momentum will be transferred to rotating arm 52 to cause rotation in one direction. Expulsion of the water vapor out the open end of the detonation chamber adds to the momentum transferred to the arm.

Detonation of the hydrogen and oxygen mixture in detonation chamber 66 as described above can cause water vapor by-products. The water vapor that moves in the direction of the closed end of the cylindrical chamber will be reflected. The motion of the rotating arm 52 will cause water vapor droplets 72 to exit the detonation chambers 66 at exhaust opening 70. The explosion of hydrogen and oxygen can be timed (by manipulating the timing of spark plug 68) so that 99% of the water vapor exits detonation chamber 66 before the next detonation.

FIGS. 4 and 6 present a description of the collection of exhaust products (e.g., water vapor). Water vapor should not be allowed to exit the engine. Water vapor is a greenhouse gas. A mesh screen 56 will permit water vapor to exit the engine. The water vapor will meet stationary cooling coils (not shown). The water vapor will condense. The screen will prevent the water droplets that have exited detonation chamber 66 through exhaust opening 70 from re-entering the detonation chamber 66. The droplets 72 will fall to the bottom of mesh 56, where they can be collected for easy disposal at periodic intervals.

One method of transferring angular momentum from the rotating arm 52 to the vehicle (not shown) is via a fan belt 54 that is mounted to sleeve 50, as shown in FIG. 4. A belt offers some advantages. A belt would allow the engine to be located some distance away from the place where the energy is applied. Certainly a belt will be needed to drive an electric generator for electricity to run various devices such as lights, the laser (or electron beam) for hydrogen extraction, climate control, an electric engine for driving in reverse, or a radio, for example.

Referring now to FIG. 10, a block diagram showing the steps according to several methods of the present invention is shown. As shown, the initial step indicated by block 74 involves storing hydrogen gas for future delivery into the engine. To do this in a stable and easy-to-transport fashion, the hydrogen is absorbed into a thin binding layer 22 of hydrogen-absorbing metal deposited on a continuous aluminum foil strip 20.

The next step (block 76) can include delivering the hydrogen into the engine. This is further accomplished by using the laser or electron beam as described above to ionize the hydrogen molecules in the binding layer 22, and the use of at least one voltage source to extract the hydrogen from the binding layer and accelerate it into the hydrogen delivery chambers 46 in axle 44. The methods further include importing oxygen into the oxygen delivery chambers 46c, 46d, as indicated by block 78. As also described above, this is accomplished through the use of a commercial scrubber. Once in delivery chambers 46, the hydrogen and oxygen are pressurized.

As arm 52 rotates around the axle 44, the hydrogen ducts 62 and oxygen ducts 64 become periodically aligned in the holes 48 in the axle as described above. When this occurs, the aforementioned path of fluid communication is established, and the hydrogen and oxygen (which are under pressure) flow separately from axle 44 into the rotating arm ducts, the respective hydrogen and oxygen ducts 62, 64 and into detonation chambers 66. Once this occurs, the methods according to several embodiments of the present invention include the step of detonating the hydrogen/oxygen mixture, as indicated by block 80 in FIG. 10. The detonation releases chemical energy that is converted into rotational mechanical energy as described above.

All the major components that come in contact with oxygen should be made of stainless steel. Although a number of commonly available metals can resist the corrosive effects of oxygen, stainless steel is widely used for many purposes for which corrosion resistance is necessary.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

What is claimed is:

1. A hydrogen storage and recovery system comprising:
    a metal substrate including a binding layer, said binding layer having a plurality of hydrogen molecules embedded therein;
    an electron source for directing electrons onto said binding layer, wherein said electron source comprises an ionization source;
    a first magnetic field; and,
    a second magnetic field orthogonal to said first magnetic field, said electrons passing through said first magnetic field and said second magnetic field, said first magnetic field and said second magnetic field cooperating to manipulate the direction of impingement of said electrons onto said binding layer, where impingement of said electrons liberates hydrogen ions from said binding layer.

2. The system of claim 1, further comprising a means for controlling said first magnetic field and said second magnetic field to change the direction of said electrons passing therethrough.

3. The system of claim 1, wherein said electron source further comprises:
    a hollow tube; and,
    a voltage source for establishing a voltage potential across said electron source to accelerate said electrons through said tube, said voltage potential being about equal to an ionization potential for said hydrogen molecules in said binding layer.

4. The system of claim 3, further comprising an ion guide for receiving hydrogen ions that are liberated from said binding layer.

5. A hydrogen storage and recovery system comprising;
    a substrate including a binding layer, said binding layer having a plurality of hydrogen molecules embedded therein;
    a plurality of cells arranged in a grid; each said cell including an electron source for directing electrons onto said binding layer, wherein said electron source comprises an ionization source, a first magnetic field and a second magnetic field orthogonal to said first magnetic field; and,
    said electrons passing through said first magnetic field and said second magnetic field, said first magnetic field and said second magnetic field cooperating to manipulate the direction of impingement of said electrons onto said binding layer, where impingement of said electrons liberates hydrogen ions from said binding layer.

6. The system of claim 5 further comprising a means for controlling the magnitude of said first magnetic field and said second magnetic field.

7. The system of claim 5 wherein said electron source further comprises:
    a tube; and,
    a voltage source for establishing a voltage potential across said electron source to accelerate said electrons through said tube, said voltage potential being about equal to an ionization potential for said hydrogen molecules in said binding layer.

8. The system of claim 7, further comprising an ion guide for receiving hydrogen ions that are liberated from said binding layer, said ion guide being located concentric to said electron source.

9. The system of claim 8, wherein said cells have a hexagonal profile when viewed in top plan.

10. The system of claim 8, wherein said cells have a circular profile when viewed in top plan.

11. The system of claim 8 wherein said cells have a square profile when viewed in top plan.

12. A method for storing and recovering hydrogen for use as fuel, said method comprising the steps of:
    A) embedding a plurality of hydrogen molecules in a binding layer on a substrate;
    B) providing a plurality or cells arranged in a grid, each said cell including an electron source, wherein said electron source comprises an ionization source, a first magnetic field and a second magnetic field orthogonal to said first magnetic field; and,
    C) accelerating electrons from said electron source through said first magnetic field and said second magnetic field and onto said binding layer; and,
    D) selectively manipulating the magnitude of said first magnetic field and said second magnetic field to affect the direction of travel of said electrons passing therethrough and thereby affect the direction of impingement of said electrons onto said binding layer, and where impingement of said electrons onto said substrate liberates hydrogen ions from said binding layer.

13. The method of claim 12 wherein said step D) is accomplished by using a computer processor.

14. The method of claim 12 wherein said step C) is accomplished by establishing a voltage potential for said electrons from said electron source that is about equal to the ionization potential for hydrogen molecules in said binding layer, and further comprising the step of:

E) collecting hydrogen ions that have ionized from said binding layer.

15. The method of claim 14, wherein said step E) is accomplished using an ion guide for receiving hydrogen ions that are liberated from said substrata binding layer, said electron source being located concentric to said ion guide.

16. The method of claim 12, wherein said step B) is accomplished using cells that have a hexagonal profile when viewed in top plan.

17. The method of claim 12, wherein said step B) is accomplished using cells that have a circular profile when viewed in top plan.

18. The method of claim 12, wherein said step B) is accomplished using cells that have a square profile when viewed in top plan.

* * * * *